United States Patent [19]

Smith

[11] Patent Number: 5,006,027
[45] Date of Patent: Apr. 9, 1991

[54] FASTENER RECEIVING CAP

[75] Inventor: Jon D. Smith, Fenton, Mich.

[73] Assignee: Dry Dock Industries, Inc., Fenton, Mich.

[21] Appl. No.: 482,107

[22] Filed: Feb. 20, 1990

Related U.S. Application Data

[63] Continuation of Ser. No. 327,781, Feb. 23, 1989, Pat. No. 4,943,253.

[51] Int. Cl.$^5$ ............................................. F16B 21/18
[52] U.S. Cl. ..................................... 411/522; 411/352
[58] Field of Search ................. 29/270, 271, 278, 279, 29/525.2, 766, 243.56; 411/15, 39, 41, 44, 55, 57, 340, 341, 342, 343, 344, 345, 346, 371, 372, 373, 431, 352, 512, 516, 522

[56] References Cited

U.S. PATENT DOCUMENTS

| | | | |
|---|---|---|---|
| 2,098,185 | 11/1937 | Hannaford | 411/516 |
| 2,512,690 | 6/1950 | Smith et al. | 411/516 X |
| 4,075,924 | 2/1978 | McSherry et al. | 411/366 |
| 4,143,581 | 3/1979 | Smith et al. | |
| 4,245,545 | 1/1981 | Freeman | 411/342 |
| 4,286,497 | 9/1981 | Shamah | 411/342 |
| 4,289,062 | 9/1981 | Schiefer | 411/340 X |
| 4,388,031 | 6/1983 | Rodgers | 411/57 X |
| 4,422,813 | 12/1983 | Greenbaum | 411/15 X |
| 4,491,447 | 1/1985 | Smith et al. | 411/15 |
| 4,650,386 | 3/1987 | McSherry | 411/340 |
| 4,886,408 | 12/1989 | Killian et al. | 411/522 X |

FOREIGN PATENT DOCUMENTS

| | | | |
|---|---|---|---|
| 8605847 | 10/1986 | PCT Int'l Appl. | 411/15 |
| 224962 | 8/1968 | U.S.S.R. | 411/522 |
| 1032307 | 6/1966 | United Kingdom | 411/512 |

Primary Examiner—Joseph M. Gorski
Assistant Examiner—Peter Dungba Vo
Attorney, Agent, or Firm—Dykema Gossett

[57] ABSTRACT

A fastener-receiving member is disclosed that can be used with either a blind hole or a hollow wall. In addition, the length of the fastener-receiving member can be adjusted to be accommodated within various thicknesses of walls. The nut portion of the fastener-receiving member is configured so that it has ridges at its outer periphery that will engage with the surface of a hole regardless of the quality of the drilled hole. A wing-like locking section will expand to insure an adequate grip between the wall and the member. In addition, an insertion tool is disclosed that aids an operator in inserting the fastener-receiving member into a hole.

2 Claims, 4 Drawing Sheets

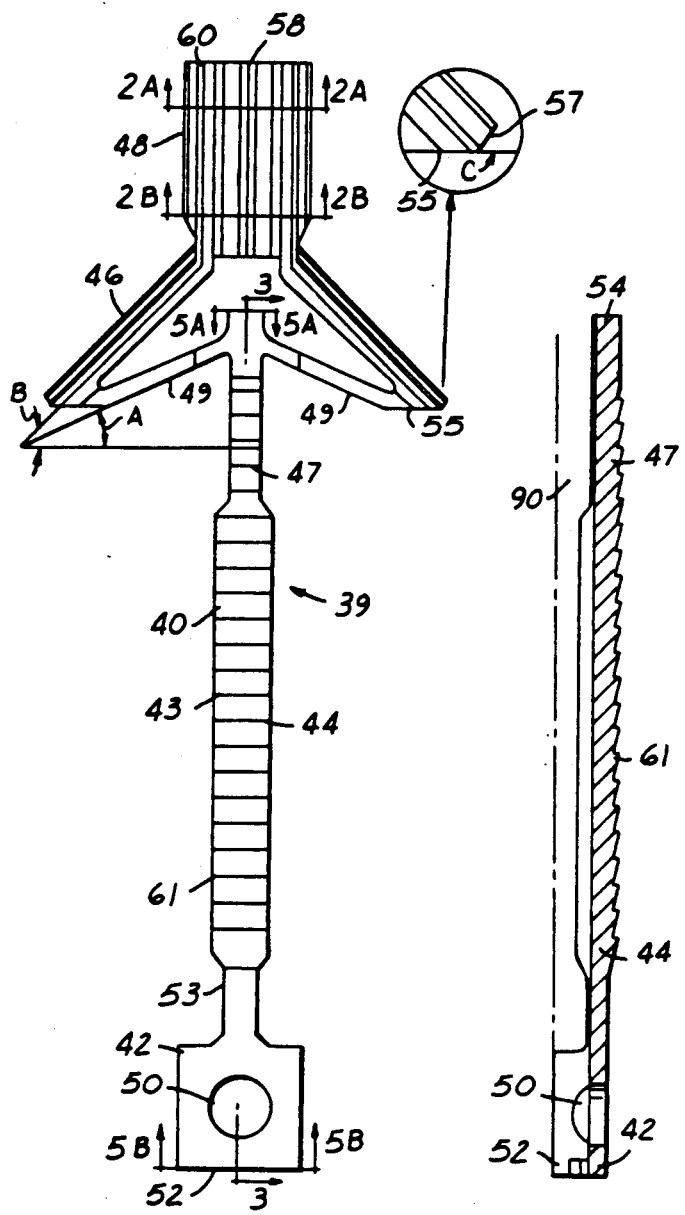
FIG.1
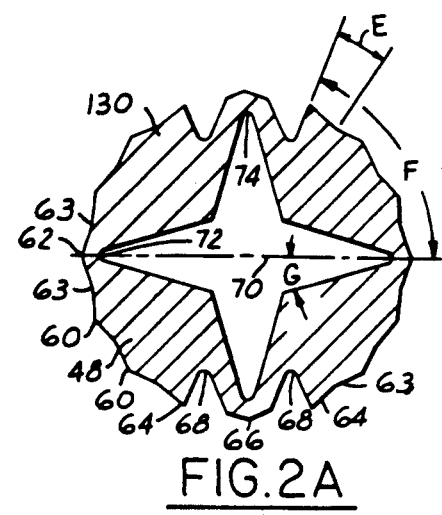
FIG.2A
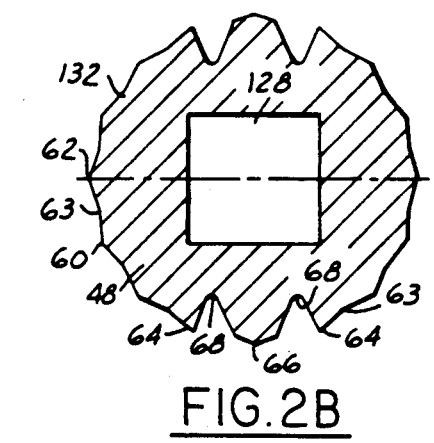
FIG.2B
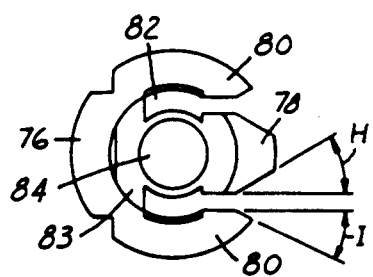
FIG.4
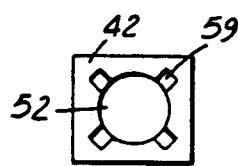
FIG.5B
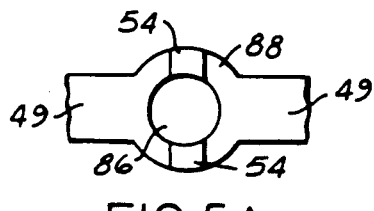
FIG.5A
FIG.3

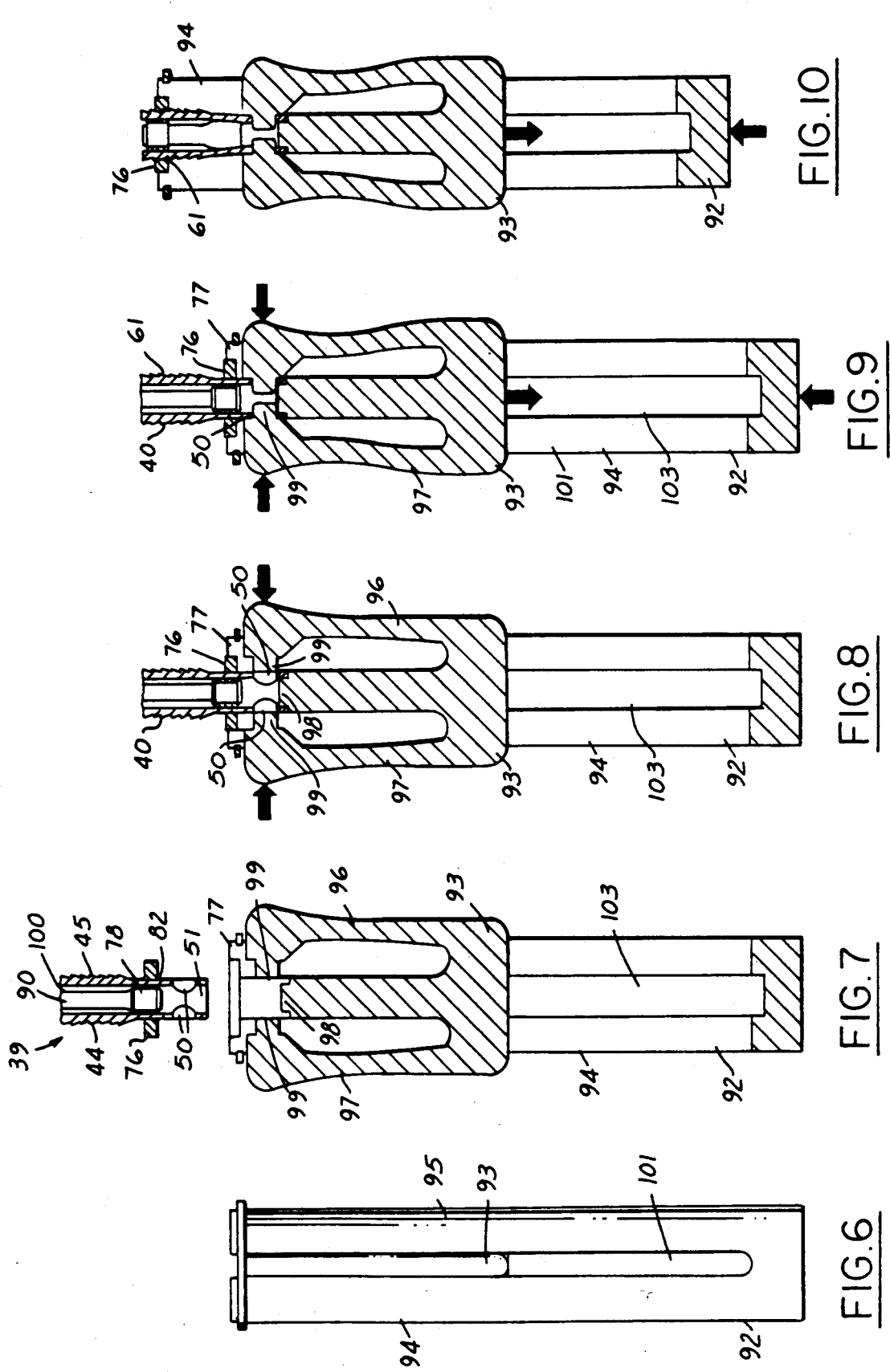

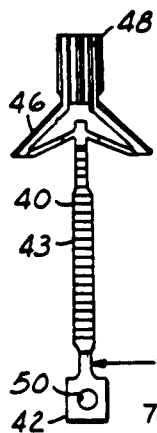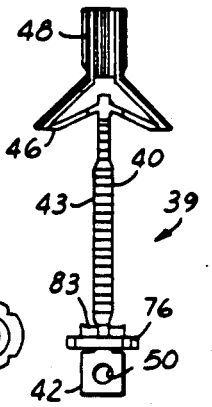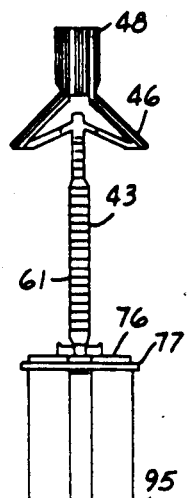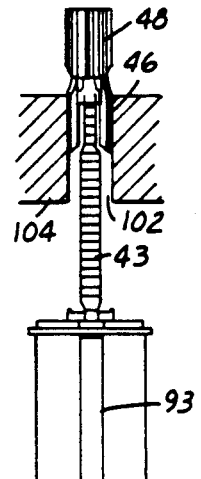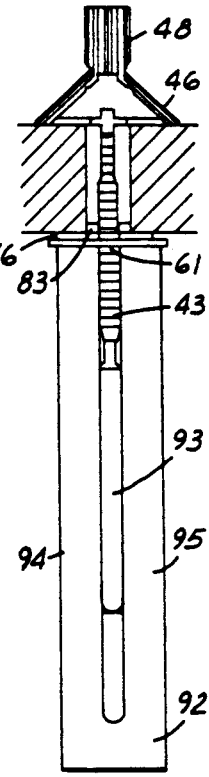
FIG. 11  FIG. 12  FIG. 13  FIG. 14  FIG. 15
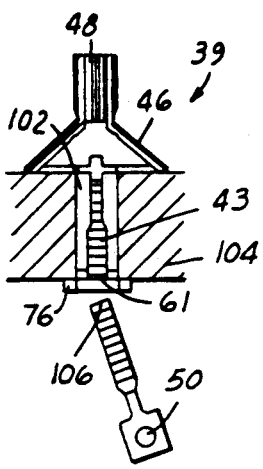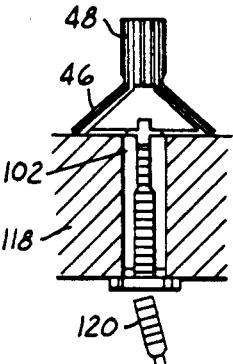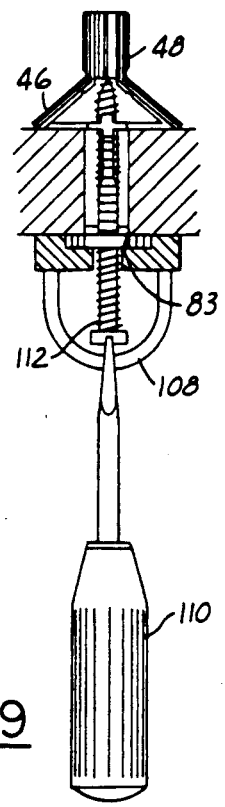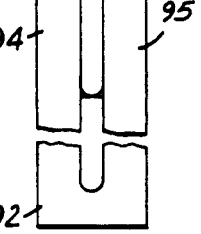
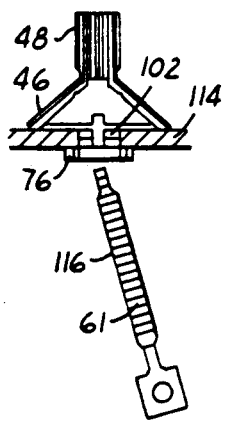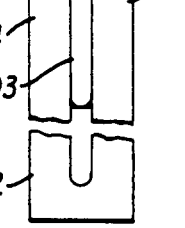
FIG. 16  FIG. 18  FIG. 20
FIG. 17  FIG. 19

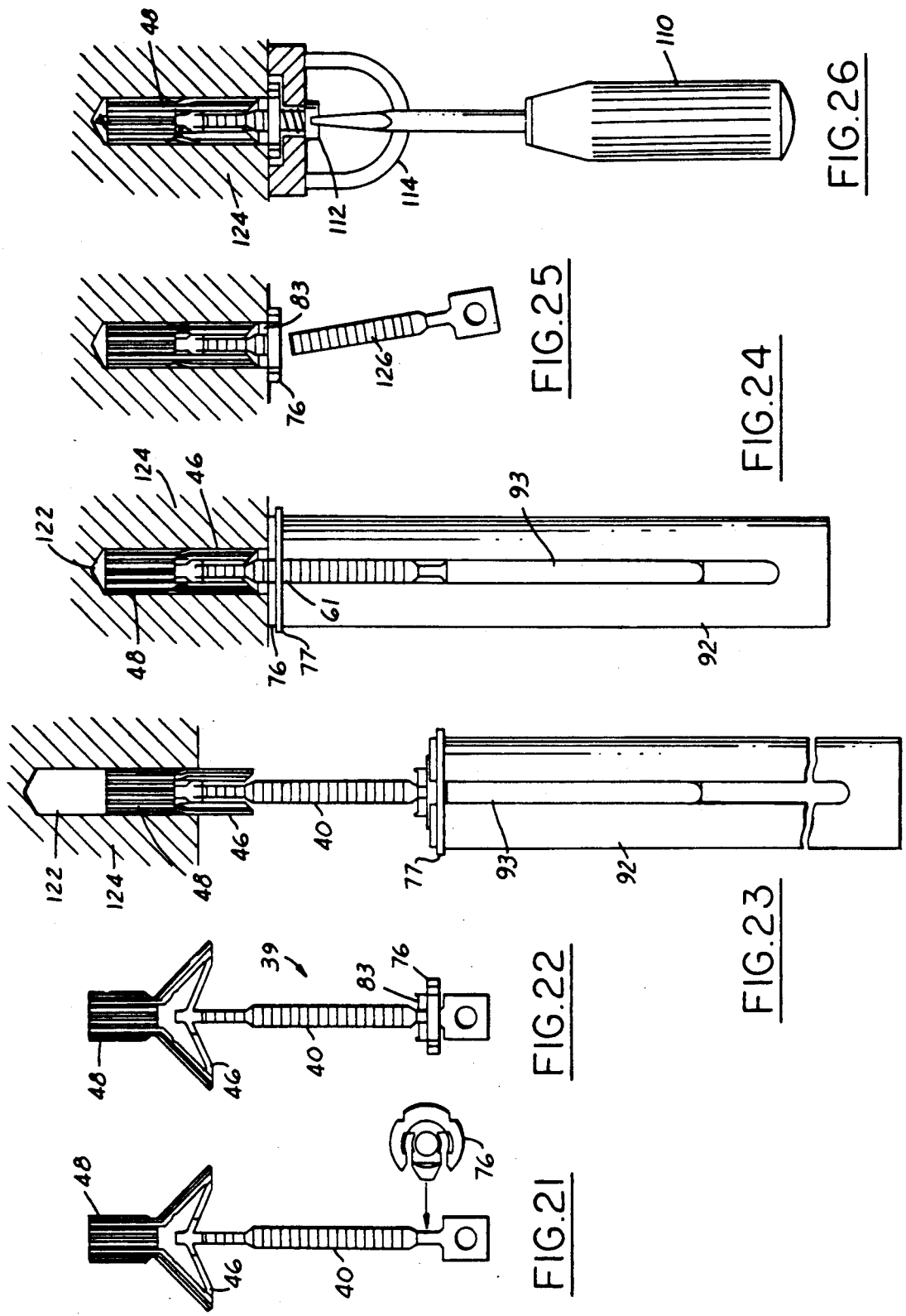

FASTENER RECEIVING CAP

This is a continuation of copending application Ser. No. 07/327,781 filed on Mar. 23, 1989, now U.S. Pat. No. 4,943,253.

BACKGROUND OF THE INVENTION

This invention relates to a trust nut toggle fastener or more generally, a fastener-receiving member that acts to closely receive a screw or other type fastener and is disposed in a hole in a wall or the like.

Several types of prior art devices are known which can be disposed in a drilled hole in a wall and are adapted to receive a screw for securing some type of item to the wall. These anchors or plugs, as they are commonly known, are inserted into a hole that is drilled into a wall and have some means of securing themselves into the hole. They generally have a central aperture that closely receives a screw or other type fastener member and act to secure some item to the wall.

An example of a successful prior art device is a combination hollow wall, blind hole fastener disclosed in U.S. Pat. No. 4,491,447 by the inventor of the present invention. This prior invention had a toggle or wing-like locking section that secured the fastener-receiving member to the wall by either being biased outwardly against the inner periphery of the drilled hole in a blind hole or expanding outwardly into its wing-like normal configuration upon having extended through a hollow wall.

The present invention is meant as an improvement over the prior art devices and in general allows the fastener-receiving member to be used more universally regardless of the trueness of the drilled hole, the thickness of the hollow wall, or the depth of the blind hole.

It is an object of the present invention to disclose a single fastener-receiving member that can be utilized with any thickness of hollow wall or depth of blind hole.

It is further an object of the present invention to disclose a fastener-receiving member that can be utilized in any drilled hole, regardless of how true the hole may be.

Moreover, it is an object of the present invention to achieve these goals with a device that is both simple in construction and application.

SUMMARY OF THE INVENTION

The present invention discloses an apparatus and method for disposing a fastener-receiving member within a drilled hole. The fastener-receiving member consists of a first generally elongate main portion that has a nut section at one axial end, a wing-like locking section extending from the nut section, a longitudinally extending extension section extending from the wing-like locking section and an insertion section extending from the extension section. A cap member is adapted to be received on the extension section and can be moved incrementally therealong. The cap defines an end of the fastener-receiving member and is moved along the extension section to adjust the axial length of the overall fastener-receiving member to conform to various size of hollow walls or depths of blind holes.

The extension section is formed of two generally elongate opposed sides with a central aperture for passage of a screw or other fastener through the extension section. Incremental teeth are formed at the outer periphery of this extension section and the cap-like member is slidably retained on these incremental teeth. The cap can be adjusted along the incremental teeth and secured at any tooth position.

The insertion section is configured so as to conform to an insertion tool that acts to grab the insertion section. This insertion tool is formed of a first sleeve member and a second gripper member that is slidably received within the sleeve member. The sleeve member acts to receive and hold the cap portion of the fastener-receiving member, and the gripper section acts to grip the insertion section of the fastener-receiving main portion. By sliding the gripper member within a channel in the sleeve member, the insertion section and the attached extension section can be moved with respect to the cap section which is incrementally advanced along the extension section teeth.

The method of the present invention has similar steps for securing a screw to a blind hole or to a hollow wall.

The cap member is first snapped onto the extension section of the main portion of the fastener-receiving member, and the entire fastener-receiving member is grasped by the insertion tool. The insertion tool gripper section acts to grab the insertion section of the main portion and the cap is received within the sleeve of the insertion tool. The insertion tool is then grasped, and the fastener-receiving member is inserted into a hole that has been drilled into the wall. The fastener-receiving member continues to be inserted until the member abuts the rear of the blind hole or the wing-like locking portion is allowed to expand outwardly after having passed through the extent of a hollow wall.

Next, force is applied towards the wall on the sleeve portion of the insertion tool which acts to transmit this force to the cap portion of the fastener-receiving member. At the same time, the gripper member of the insertion tool may be pulled away from the wall, which transmits a force to the insertion section and therethrough into the extension section of the main portion. This causes the extension section to be incrementally advanced through the cap member, and the cap member is moved along the extension section until the cap member abuts the surface of the wall. A neck section on the cap will be received within the hole. Since the cap member is firmly held on the incremental teeth of the extension member, the fastener receiving member will now be firmly held within the hole. The operator then releases the fastener-receiver member from the insertion tool and simply cuts or snaps off the insertion section and any portion of the extension section that extends out of the hole beyond the cap member. The cap member is tightly received on the incremental teeth and thus acts as an easy breakpoint so that the extra extension portion of the fastener-receiving member can be simply removed. The remaining portion of the fastener-receiving member forms a secure member for receiving a screw or other type fastener.

BRIEF DESCRIPTION OF THE DRAWINGS

FIG. 1 is a plan view of a side of the main portion of the fastener-receiving member of the present invention.

FIG. 2A is a cross-section along lines 2A—2A of FIG. 1.

FIG. 2B is a cross-section along lines 2B—2B of FIG. 1.

FIG. 3 is a cross-section along lines 3—3 of FIG. 1.

FIG. 4 is a plan view showing the configuration of a cap for use with the main portion of the fastener-receiving member of the present invention.

FIG. 5A is a cross-section along lines 5A—5A of FIG. 1.

FIG. 5B is a cross-section along lines 5B—5B of FIG. 1.

FIG. 6 shows a side view of the insertion tool of the present invention.

FIGS. 7-10 show a view rotated ninety degrees from that shown in FIG. 6 and illustrates the use of the insertion tool with the fastener-receiving member and cap of the present invention.

FIGS. 11-20 are views showing the individual steps that form the method for inserting the fastener-receiving member within a hollow wall.

FIGS. 21-26 are views similar to that shown in FIGS. 11-20 but illustrating the use of the fastener-receiving member of the present invention with a blind hole.

DETAILED DESCRIPTION OF THE INVENTION

The structural features of the fastener-receiving member 39 of the present invention can be best understood from FIGS. 1-5. As shown in FIG. 1, a main portion 40 of the fastener-receiving member 39 of the present invention has insertion section 42, extension section 43 formed of a first and second opposed longitudinally extending sides 44, 45 which extend away from the insertion section to a locking toggle-like expanding wing section 46, which is in turn connected to an expanding trust nut section 48. In a sense, insertion section 42 is an intermediate member which integrally connects sides 44 and 45. A merging extension section 47 is associated with each of the first and second longitudinally extending sides 44, 45 and is the portion of the sides that actually connect into the locking section 46. An end 54 of the extension section extends past the intersection of the merging extension 47 and locking sections 46 and will act as a stop, as will be explained below. Locking section 46 is formed of first wing sections 49, resiliently attached to extend racially outwardly from the merging extension section 47 and extending rearwardly away from the nut section 48 on an angle A, in a preferred embodiment, 25 degrees. Second wing sections 51, are resiliently attached to extend radially outwardly and rearwardly away from nut section 48 along an angle B, in a preferred embodiment, 45 degrees. Both angles are measured from a line drawn perpendicular to a central axis of the main portion 40. First wings 49 are connected to second wings 51 at merger portion 55 and first position 57 that is slanted on an angle C, 45 degrees in a preferred embodiment.

The insertion section 42 is generally cube-like and has opposed insertion holes 50 on the sides of the cube corresponding to the two longitudinally extending sides 44, 45. In addition, the top of the insertion section 42 is formed with a central aperture 52.

The expanding nut section 48 is formed with a first end 56 and a second end 58. Ridges 60 extend between first end 56 and second end 58 of expanding nut section 48.

A relief section 53 covers a smaller circumferential arc than section 43, thus making it easier to snap the cap 76 onto the section 43.

As can best be seen in FIG. 2A, several of the ridges 60 are formed at the outer periphery of the generally cylindrical nut section 48 and are interspaced with valleys 63. FIG. 2A shows the expansion section 130, the overall shape of which is such that it is generally in four separate parts with end ridges 64 defining one end of each of the four parts, and connecting ridges 66 connecting two of the end ridges 64 with intermediate deep connecting valleys 68. At the end of the four parts opposite end ridge 64 connecting ridges 62 connect the four parts. Expansion section 130 is formed with a central screw aperture 70 that is generally in the shape of a four-pointed star with star points 72 that correspond to the connecting ridges 62 and star points 74 corresponding to connecting ridges 66. The star points have an angular extent defined as twice an angle G, 15 degrees in a preferred embodiment. The distance between the peak of one ridge, 60 or 64 and the next adjacent valley 63 is defined by an angle E measured from the central axis of the generally cylindrical nut section 48 that in a preferred embodiment is 11.25 degrees. The overall angular extent of each of the four parts of the nut section 48 is defined by an angle F. Angle F is shown as equal to 6 angle E's, or 67.5 degrees in a preferred embodiment. It could also be defined as 90 degrees minus the angular extent of the deep valleys 68.

FIG. 2B illustrates the trust nut portion 132 of nut section 48. As shown in FIG. 2B, the outer periphery of trust nut portion 132 is similar to that of expansion section 130 and includes features 60, 62, 63, 64, 66, and 68. The aperture 128 formed in the center of trust nut section 132 is illustrated as a rectangular shape, here a square. However, it is envisioned that this aperture 128 could be formed to be circular. It is aperture 128 that most closely holds the screw.

FIG. 3 shows only one side wall 44; however, it is to be understood that there is a symmetrically arranged opposite side wall 45 not illustrated in this view. As shown in FIG. 3, side wall 44 has a merging extension 47, incremental teeth 61, and extends into the insertion section 42. A channel 90 is defined between the opposed side walls 44, 45.

FIG. 4 shows the cap member 76 which is the second portion of the fastener-receiving member 39 of the present invention. Cap 76 has a center tooth 78 that is adapted to be received between the first and second longitudinally extending sides 44, 45 of the extension section 43 and two side teeth 80 that are received on the outer periphery of the first and second longitudinally extending sides 44, 45. The first and second longitudinally extending sides 44, 45 snap into curved channels 82 that are defined between the center tooth 78 and the side teeth 80. A central aperture 84 is formed in the center of the cap and acts as a guide for passage of a screw or other type fastener. A cap neck 83 extends out of the nominal plane of the cap 76 for a purpose to be described later. Cap neck 83 is approximately of the same diameter as the drilled hole that the fastener-receiving member 39 is to be used with.

Cap center tooth 78 is shaped by angle H, 30 degrees in a preferred embodiment, and side teeth 80 are shaped by angle I, 30 degrees in a preferred embodiment.

FIG. 5A shows the concentration of the intersection ends 54 that connects the merging extension 47 to the first wings 49. As shown in FIG. 5, a generally circular portion 88 connects the first and second longitudinally extending sides 44, 45 through their respective merging extension sections 47 into the first wings 49 of the locking section 46. Central aperture 86 can be seen to extend through the center of extension-wing connecting section 88 and is adapted for passage of the screw or other fastener member.

FIG. 5B shows a view looking from the end of insertion section 42 towards the remainder of fastener-receiver 39. As shown in FIG. 5B insertion section 42 has an aperture 52 and four notches 59. Notches 59 will aid in gripping insertion section 42 should some sort of mechanical driving device be developed for attaching the fastener-receiver member 39.

The insertion tool and its relationship to the fastener-receiving member 39 will now be explained with reference to FIGS. 6-10. As shown in FIG. 6, the insertion tool has first sleeve-like member 92 and second gripper member 93. Sleeve-like member 92 is formed with two sides 94, 95 which have an intermediate channel 101 formed therebetween. Gripper member 93 is slidably received within this channel 101.

As shown in FIG. 7, gripper member 93 has side portions 96, 97 and central core plug 98. Side portions 96, 97 are formed with gripper plugs 99. The sleeve member 92 is formed with cap-receiving portion 77.

It can also be appreciated from FIG. 7 that the sides 44, 45 have a curved inner and outer profile, inner profile 100 being illustrated and corresponding to the curved channels 82 in cap 76.

As can be seen in FIG. 8, the aperture 52 through the top of the main portion is received on plug 98 of gripper portion 93 of the insertion tool, gripper plugs 99 are received within insertion holes 50 formed in insertion section 42 of main portion 40, and cap member 76 is closely received within cap receiving portion 77 of sleeve 92. The cap 76 is thus received on the sleeve member 92 of the insertion tool, and main portion 40 is received on gripper portion 93 of the insertion tool.

As shown in FIG. 9, an operator would apply a force radially inwardly on the two sides 96 and 97 of gripper portion 93 to ensure that plugs 99 are received within holes 50 and would pull away from a wall on gripper portion 93 so as to slide gripper portion 93 within channel 101 of sleeve 92. At the same time sleeve 92 would be pushed towards the wall. When the gripper member 93 is slid within channel 101 of sleeve 92, the main portion 40 of the fastener-receiving member is slid with respect to the cap 76, and the cap 76 is incrementally advanced along teeth 61.

FIG. 10 shows gripper member 93 being slid away from a wall with respect to sleeve 92, causing cap 76 to advance toward a wall along incremental teeth 61.

A method of using the fastener-receiving member 39 of the present invention will now be described with particular reference to FIGS. 11-20. As shown in FIG. 11, the first step in the use of the fastener-receiving member of the present invention is to snap cap member 76 onto relief portion 53 of extension section 43.

As shown in FIG. 12, cap 76 is initially slidably received near the top of extension section 43 and is arranged such that neck 83 extends in the direction of locking section 46.

As shown in FIG. 13, main portion 40 and cap 76 of the fastener-receiving member of the present invention are received within the insertion tool 92, 93 as explained above.

As shown in FIG. 14, the fastener-receiving member 39 is inserted into hole 102 formed in hollow wall 104 by first inserting nut section 48 into the hole and pushing the remainder of the fastener-receiving member into the hole 102. As can be appreciated from FIG. 14, the hole 102 would be of a smaller radius than the outer radius of expanding wing-locking section 46, and thus the wing-like members will be bent resiliently back radially inwardly towards the center axis of main portion 40. It is to be understood that these wing-like members have a relaxed position as illustrated in FIG. 1 and would tend to be biased back towards that relaxed position. As the wings bend inwardly, they tend to draw the nut section 48 closer to the extension section 43. At a point, nut section 48 will contact the bottom 54 and will prevent further inward bending of the wing-like members.

As shown in FIG. 15, once the extent of wing-like portion 46 extends through the hollow wall 104, the wing-like members will be biased back outwardly towards their relaxed position, thus locking the head or main portion of the fastener-receiving member 39 to the hollow wall 104. As can be appreciated from the discussions above, the cap 76 is then incrementally advanced along the teeth 61 of extension section 43 until it abuts wall 104 thus securing the front of the fastener-receiving member 39. Cap neck 83 extends into hole 102 to provide a firm grip. As shown in FIGS. 15-20, the wing section 46 does not return to its relaxed position with the first wings extending away from the nut section 48, since the wall 102 tends to hold the wings perpendicular to the wall surface and thus a force is applied by the wings against the wall as they try to return to their relaxed position. This wing applied force holds the member in place until the screw can be inserted.

As shown in FIG. 16, a top portion 106 of extension section 43 is removed above cap 76. Since cap 76 is so firmly received upon teeth 61, the cap will act as a breaking point for this extra extension 106 and aid in removing it at the proper point.

As shown in FIG. 17, the fastener-receiving member 39 is mounted to a relatively thin wall 114. When the fastener-receiving member 39 is used with thin wall 114, cap 76 is advanced along extension section 43 to a point near the end of extension 43 and perhaps onto the merging extension section 47. As can be seen in FIG. 17, extra extension 116 that is removed from the main portion 40 is rather long.

FIG. 18 shows the use of the fastener-receiving member 39 with a relatively thick hollow wall 118. As shown in FIG. 20, when the fastener-receiving member 39 is used with this thicker hollow wall, the extra extension section 120 that is removed from the main portion 40 is relatively short when compared with the extra extension section 116 that is removed from thinner wall 114.

As shown in FIG. 19, a hook 108 is being fastened along with screw 112 by screwdriver 110 within the fastener-receiving member 39. As can be understood, the screw 112 would first pass through the aperture 83 in cap 76, through channel 90 in what remains of extension section 43, through aperture 86 and into the aperture 70 formed within nut section 48.

As shown in FIG. 20, screw 112 is tightly received within the fastener-receiving member and has drawn nut section 48 upwardly along the screw threads so as to compress wing-like locking section 46 and firmly lock the fastener-receiving member 39 to the hollow wall 104 at both axial extents.

The use of fastener-receiving member 39 with a blind hole will now be described with reference to FIGS. 21-26. As shown in FIG. 21, the cap 76 is first snapped to main portion 40 in a step identical to that performed when using fastener-receiving member 39 with a hollow wall.

FIG. 22 shows the cap 76 in its attached position with respect to main portion 40 of fastener-receiving member 39.

As shown in FIG. 23, fastener-receiving member 39 is inserted into a blind hole 122 formed within wall 124. The diameter of hole 122 is smaller than the outermost radial extent of the relaxed position of wing-like locking section 46, and thus the wings of locking section 46 are bent radially inwardly as fastener-receiving member 39 is inserted into blind hole 122. Fastener-receiving member 39 is inserted into blind hole 122 until it abuts the lower end of the blind hole.

As shown in FIG. 24, cap 76 is incrementally adjusted along extension section 43 until it comes into contact with the surface of wall 124.

As shown in FIG. 25, an extra extension section 126 is removed above cap 76 similar to the step performed with a hollow wall. Again, cap neck 83 will be received in the blind hole 122.

As shown in FIG. 26, a screw 112 can then be inserted into the fastener-receiving member 39. When the fastener-receiving member 39 is used with a blind hole 122, screw 112 will enter into nut-lock section 132 and then into expansion section 130 and force the four parts of expansion section 130 radially outwardly. This causes the various ridges 60, 62, 64, 66 to come into contact with the inner periphery of blind hole 122. Since the various ridges act as hole-contacting members, it is not necessary that the hole be drilled perfectly true. Nor is it necessary that the hole be perfect solid. For instance, if the wall 124 was formed of a plaster that was becoming flaky in the vicinity of hole 122, the ridges would still insure secure contact between fastener-receiving member 39 and wall 124. The screw also drives the wings 46 to lock the member 39 in the blind hole.

A preferred embodiment of the fastener-receiving member is for use with a 5/16 inch hole and can be used with hollow-wall of 1/161 inch thick. If a wall is thicker than 1 inch it would normally be treated as a blind hole. Also, it is anticipated that several diameters of fastener-receiving member would be available to correspond to various diameter holes and fasteners.

A fastener-receiving member has been disclosed in combination with an insertion tool that will allow the fastener-receiving member to be utilized with either a hollow wall or a blind hole. The fastener-receiving member can be adjusted to accommodate various thicknesses of walls and will also be firmly received within the wall regardless of the quality of the drilled hole. Moreover, the fastener-receiving member of the present invention achieves these benefits with relatively simple parts that are easy to utilize.

A working embodiment of the present invention has been disclosed; however, further modifications of the invention may be made without departing from the scope and content of the invention, which can be better understood when considered in light of the appended claims.

I claim:

1. A cap member for use with a fastener receiving member comprising:

a center tooth adapted to be received between first and second longitudinally extending sides of a fastener receiving member, two side teeth adapted to be received on the outer periphery of the first and second longitudinally extending sides of a fastener-receiving member;

curved channels being defined between said center tooth and each side tooth and each extending in a first arc, said first arc being greater than an arc over which the longitudinal sides of the fastener receiving member the cap is to be utilized with extends;

said curved channels extending between said center tooth and said side teeth to channels opening at a radially outer portion of said cap;

a central aperture formed in said center tooth for passage of a screw or other fastener, a line segment being drawn from a center of said central aperture to a center of one of said channel openings, in a plane drawn perpendicular to said center axis, is non-parallel to, and defines an angle of less than 180 degrees with, a line segment drawn in the same plane from said center of said central aperture to the center of the other of said channel openings, and both of said channel openings being received within a 180 degree arc drawn about said center of said central aperture:

said side teeth being resiliently biased towards said center tooth such that the first and second longitudinally extending sides of a fastener-receiving member may be snapped into said curved channels, springing said side teeth radially outwardly, and said side teeth will be resiliently returned to a first position securing said first and second longitudinal sides within said curved channel;

said channels being defined by a first channel portion of a first thickness at a radially inner portion of said cap, and a second channel portion of a second thickness spaced towards said radially outer portion from said first channel portion said first thickness being greater than said second thickness and said second thickness being less than the lateral thickness of the longitudinal sides of the fastener receiving member that the cap is to be utilized with, said second channel portion being located at the arc portion which is greater than the arc of the longitudinal sides of the fastener receiving member such that said second portion can snap over the longitudinal sides of the fastener receiving member; and said cap having a nominal first plane and a neck extending outwardly from said first plane, said neck being generally cylindrical and centered about said central aperture, said neck being sized such that its cylindrical shape will fit within a hole that the fastener receiving member is to be utilized with.

2. The cap as recited in claim 1, and further wherein said center tooth has a radially outer portion, said radially outer portion of said center tooth being defined as an entrance section, said entrance section of said center tooth extending for a first arc, said center tooth entrance section expanding outwardly along a direction extending radially inwardly, such that such entrance section has an arc at an inner portion greater than said first arc and defining a ramped entrance into said curved channel to facilitate insertion of the first and second longitudinally extending sides of the fastener receiving member.

* * * * *